3,796,739
GROUP VIII–B METAL ORGANOMERCURY COMPOUNDS AND PROCESS OF PREPARATION
George M. Intille, Maryland Heights, Mo., assignor to Monsanto Company, St. Louis, Mo.
No Drawing. Filed Sept. 23, 1971, Ser. No. 183,226
Int. Cl. C07f 3/10
U.S. Cl. 260—432          25 Claims

ABSTRACT OF THE DISCLOSURE

Novel compounds of the formula $$M(CO)_y(ERR^1R^2)_zHgR^3$$

where

M is cobalt, rhodium or iridium,
E is a Group V–A element except bismuth,
R, $R^1$ and $R^2$ are hydrogen or organic groups,
$R^3$ is an organic group,
y is an integer from 1 to 3, and
z is an integer from 1 to 3.

Also described is a process for the preparation of the above compounds comprising reacting a carbonyl (organo-substituted Group V–A element) transition metal with an alkali metal in the presence of carbon monoxide followed by a further reaction of the product so obtained with an organomercury compound.

BACKGROUND OF THE INVENTION

This invention pertains to novel organomercury Group VIII metal compounds containing both carbonyl groups and organo-substituted Group V–A element groups attached to the Gorup VIII metal.

A large number of transition metal complexes have been prepared during the past several years. More recently, the preparation and characterization of complexes containing metal-metal bonds has been the center of considerable interest since many versatile compounds can be made by building around the metal-metal bonds. Specifically, the prior art discloses the preparation and investigation of mercury-rhodium and mercury-iridium complexes containing carbonyl and phosphine groups bonded to the transition metal. But these prior art compounds have also contained other substituent groups, such as halogen or acyloxy groups, bonded to the mercury.

SUMMARY OF THE INVENTION

If organo-mercury-transition metal complexes containing only carbonyl and organo-substituted Group V–A substituents bonded directly to the transition metal could be provided, such compounds would be both novel as well as useful as catalysts for reactions not catalyzed by related compounds now available to those skilled in the art. The foregoing statement constitutes the principal object of this invention.

This invention pertains to compounds of the formula $$M(CO)_y(ERR^1R^2)_zHgR^3$$

where

M is a Group VIII metal which is cobalt, rhodium or iridium,
E is a Group V–A element having an atomic weight less than 150,
R, $R^1$ and $R^2$ are each hydrogen or monovalent hydrocarbon,
$R^3$ is monovalent hydrocarbon,
y is an integer from 1 to 3, and
z is an integer from 1 to 3.

The above compounds are useful as catalysts for the hydrogenation, carbonylation and carboxylation of olefins and as chemical intermediates for a number of other compounds, many of which are also catalysts for other chemical reactions. As an example, the compounds of this invention can be used as starting reactants to prepare carbonyl substituted Group V–A compound transition metal halides which are effective catalysts for olefin carboxylation reactions.

Another feature of this invention pertains to a process for preparing the above compounds comprising (a) reacting a compound of the formula $$(CO)_a—M—(ERR^1R^2)_bX_c$$

where the M, E and R groups have the same designations set forth above,
X is a monovalent anion,
a is an integer from 0 to 4,
b is an integer from 1 to 4,
c is an integer from 1 to 4, and
the sum of $a+b+c$ is 4 to 6, with an alkali metal in the presence of carbon monoxide, and (b) subsequently reacting the product formed with an organomercury group of the formula $$(R^3Hg)^+$$

where $R^3$ has the same designation indicated above.

DESCRIPTION OF THE PREFERRED EMBODIMENTS

Transition metals of Group VIII useful in the compounds of this invention are cobalt, rhodium and iridium. Of the three elements, rhodium and iridium. Of the three elements, rhodium and iridium are preferred. The designation "Group VIII" refers to that group of elements in the Periodic Table of the Elements bearing that group classification. An essential feature of the invention is that the transition metal is bounded directly to the mercury of the organomercury group described hereinbelow.

It is theorized that the carbonyl groups in the subject compounds are bonded to the transition metal through coordinate bonds in the following manner:

$$O{\equiv}C—\overset{|}{\underset{|}{M}}—C{\equiv}O$$

The exact structure and type of bonds joining the transition metal and its substituent carbonyl groups may be somewhat different from that depicted. It should therefore be understood that the above formula is intended to be explanatory only and does not constitute a material limitation to the compounds of this invention. The number of carbonyl groups in a compound of the invention can be either one, two or three.

The moiety E in the formula can be any element Group V–A of the Periodic Table except bismuth. The operable elements therefore include nitrogen, phosphorus, arsenic and antimony. Since all four of the operable elements have atomic weights lower than 150 whereas the atomic weight of bismuth is much higher than 150, the atomic weight limitation provides a convenient means of defining the scope of operable Group V–A elements. Particularly preferred Group V–A elements are phosphorus and arsenic.

The groups R, $R^1$ and $R^2$ can be either hydrogen or monovalent hydrocarbon. Examples of suitable R, $R^1$ and $R^2$ monovalent hydrocarbon. Examples of suitable R, $R^1$ and $R^2$ monovalent hydrocarbon groups include alkyl, aryl, aralkyl, alkaryl, alkenyl and alkynyl groups having up to 30 or more carbon atoms. The monovalent hydrocarbon groups may further contain substituent functional groups such as hydroxy, alkoxy, amino, acyl, carboxy, alkoxycarbonyl, cyano, mercaptan and halogen. The R groups can either be attached directly to the element E, or one or more of them can be attached to the element E indirectly through an oxygen, sulfur or nitrogen atom. Specific examples of suitable R, $R^1$ and $R^2$ groups are hydrogen, hydroxy, thiol, amino, methyl, ethyl, decyl, phenyl, tolyl, benzyl, vinyl, allyl acetylenyl, diethylamino, hydroxyphenyl, fluoro-, chloro-, bromo- and iodo-propyl, eicosenoic, thiolauryl and others. Particularly preferred are those R groups where the hydrogen or monovalent hydrocarbon group is attached directly to the element E without any linking nitrogen, oxygen or sulfur atom. Within this preferred class of R groups, the alkyl, aryl, alkaryl and aralkyl groups are further preferred. It is even more preferred that the R groups have a maximum of ten carbon atoms, and especially from about two to about seven carbon atoms. Combining all of the foregoing preferences indicates that ethyl, propyl, butyl, amyl, hexyl, cyclohexyl, phenyl, tolyl, xylyl and benzyl groups are some of the most highly preferred groups for the compounds of this invention. From the foregoing, it can be seen that the term "monovalent hydrocarbon" includes both unsubstituted monovalent hydrocarbon groups as well as groups containing substituents such as those mentioned above. Furthermore, the term also includes those monovalent hydrocarbon groups which are attached indirectly to the mercury or Group V–A element through an intermediate connecting atom, e.g. ethoxy, N-anilido, etc.

Since each of the R, $R^1$ and $R^2$ groups in the —$ERR^1R^2$ moiety can be the same or different, a wide variety of —$ERR^1R^2$ groups are possible, Examples include trimethylphosphine, triethylphosphine, phenylphosphine, diphenylphosphine, triphenylphosphine, methyldiphenylphosphine, benzyldimethylphosphine, tribenzylphosphine, cyclohexyldiethylphosphine, triphenylarsine, tritolylarsine, tribenzylarsine, tricyclohexylarsine, dimethylarsine, tri-p-phenoxyarsine, o-hydroxyphenyldimethylarsine, trimethylstibene, cyanomethyldiphenylstibene, diacetylstibene, acetoxydiphenylstibene, trimethylamine triphenylamine, benzyldiphenylamine, cyclohexyldimethylamines and others.

The number of —$ERR^1R^2$ groups in the subject compounds can be either one, two or three. Combining the number of possible —$ERR^1R^2$ groups with the number of possible carbonyl groups shows that there can be a combined total of from 2 to 6 groups attached to the transition metal in addition to the organomercury group. The preferred combined total of carbonyl and —$ERR^1R^2$ groups with the number of possible carbonyl groups shows that there can be a combined total of from 2 to 6 groups attached to the transition metal in addition to the organomercury group. The preferred combined total of carbonyl and —$ERR^1R^2$ groups is from 3 to 5 and more preferably 4.

The $R^3$ group has the same scope as that described for the R, $R^1$ and $R^2$ groups except that $R^3$ cannot be hydrogen but is instead limited to monovalent hydrocarbon which is preferably directly attached to the mercury atom but can optionally be linked to the mercury atom through an oxygen, sulfur or nitrogen atom. As with the other R groups, the $R^3$ monovalent hydrocarbon groups can be substituted with a large number of diverse functional groups.

Infrared and nuclear magnetic resonance (NMR) spectra of compounds within the scope of this invention suggest that the compounds probably have the following structure

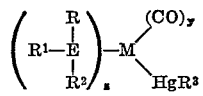

It should be understood that the exact structure may differ somewhat from the above proposed structure. The proposed structure is intended to be explanatory only and not a limiting feature of the invention.

With the foregoing descriptions of suitable elements and substituent groups in mind, it can be appreciated that the present invention encompasses a large number of individual compounds. Some representative examples of compounds include tris(carbonyl)triphenylphosphine phenylmercury cobalt,
tris(carbonyl)triphenylamine ethylmercury cobalt,
bis(carbonyl)triphenylarsine benzylmercury cobalt,
tris(carbonyl)bis(ethyldiphenylstibene) tolyloxymercury cobalt,
bis(carbonyl)bis(benzyldimethylphosphine) hydroxyphenylmercury cobalt,
bis(carbonyl)bis(triethylarsine) benzylmercury cobalt,
tris(carbonyl)bis(diphenylamine) phenylmercury cobalt,
bis(carbonyl)methylaminodiethylarsine aminomethylmercury cobalt,
tris(carbonyl)triethylphosphine phenylmercury rhodium,
tris(carbonyl)triphenylarsine cyclohexylmercury rhodium,
tris(carbonyl)triphenylphosphine phenylmercury rhodium,
bis(carbonyl) cyclohexyldiethylstibene ethoxymercury rhodium,
bis(carbonyl)bis(diacetylstibene)benzylmercury rhodium,
tris(carbonyl)bis(triphenylphosphine)tolylmercury rhodium,
tris(carbonyl)triethylamine p-anilinemercury rhodium,
bis(carbonyl)bis(tritolylphosphine) phenylmercury rhodium,
bis(carbonyl)bis(methyldiphenylarsine) benzylmercury rhodium,
bis(carbonyl) diphenylstilbene cyclohexyloxymercury rhodium,
tris(carbonyl)bis(cyclohexyloxyarsine)-m-benzaldehydemercury iridium,
tris(carbonyl)tribenzylphosphine tolylmercury iridium,
bis(carbonyl)bis(triphenylamine) decylmercury iridium,
bis(carbonyl)diethylphosphine allylmercury iridium,
tris(carbonyl)triphenylarsine phenylmercury iridium,
tris(carbonyl)dicyclohexylstibene benzylmercury iridium,
tris(carbonyl)butyldiphenylamine ethoxymercury iridium,
tris(carbonyl)bis(dibenzylphosphine) benzylmercury iridium, and
bis(carbonyl)bis(tri-n-butylarsine) tolylmercury iridium.

Compounds of the present invention are synthesized in a two-stage reaction. In the first stage, a compound of the formula $$(OC)_a—M—(ERR^1R^2)_b \, X_c$$

where

M, E and the R groups have the same designations set forth above,
X is a monovalent anion,
$a$ is an integer from 0 to 4,
$b$ is an integer from 1 to 4,
$c$ is an integer from 1 to 4, and
the sum of $a+b+c$ is 4 to 6, is reacted with an alkli metal in the presence of carbon monoxide. The resultant product is then reacted with an organomercury group of the formula $$(R^3Hg)+$$

where $R^3$ has the same designation indicated above, to form the compounds of this invention.

The monovalent anion X can be any halogen ion such as fluoride, chloride, bromide or iodide, or a hydroxy group, a hydride, i.e. H−, an alkanoate, acetyl or similar organic substituent. The $(CO)_a—M—(ERR^1R^2)_bX_c$ starting reactant can itself be prepared by reacting a transition metal compound such as a metal halide with a hydrocarbon substituted Group V–A element compound in the presence or absence of carbon monoxide. The number of carbonyl groups attached to the transition metal can vary from none to 3. The reason why a starting reactant having no carbonyl groups can be used is that carbonyl groups can be added to the transition metal compound when it is reacted with the alkali metal in the presence of carbon monoxide. The number of —$ERR^1R^2$ groups can vary from 1 to 3. If the starting reactant contains more —$ERR^1R^2$ groups than are desired in the finished compound, they can be removed prior to or during the reaction to provide the desired number of —$ERR^1R^2$ groups in the final product.

The starting reactant $(CO)_a$—M—$(ERR^1R^2)_bX_c$ is reacted in the presence of carbon monoxide with an alkali metal, i.e. a metal of Group I-A of the Periodic Table. This includes lithium, sodium, potassium, rubidium, cesium and francium. Preferred are sodium and potassium. The alkali metal is in elemental form and is preferably but not necessarily dispersed in the form of a mercury amalgam to reduce its reactivity.

The reaction can be carried out in the presence of a solvent for the transition metal compound. Alternatively, a dispersing medium in which both reactants are insoluble can be used. Examples of suitable solvents and dispersing mediums are ethers such as dibenzyl ether, cyclic ethers such as tetrahydrofuran, paraffins such as dodecane and nonane, aromatics such as benzene, toluene and xylene and the like. Reaction temperatures can vary from the freezing point of the solvent or dispersing medium up to 200° C. or more. Preferred temperatures will vary, depending upon the particular reactants being employed. For many preferred reactants, temperatures from 20 to 80 or 100° C. are frequently used. Reaction times will similarly vary depending upon temperatures and reactants. It can be appreciated for instance that some reactants will instantaneously react to yield the finished product under proper conditions. Other reactants may require several days to produce only a partial yield of the desired product. Practical considerations in many instances will require that the reaction be completed in less than 24 hours, preferably less than eight hours. Reaction can be carried out at pressures from 350 mm. Hg or less to several atmospheres, with preferred pressures being about one atmosphere. At higher pressures, it may be desirable to dilute the carbon monoxide with a gas which is inert to the reaction being carried out. Helium and nitrogen are examples of such gases. At one atmosphere pressure, carbon monoxide is usually used undiluted with any inert gases. In addition to the organomercury compound, the alkali metal forms a salt with the X anion, which salt can be removed by conventional means if desired.

Following completion of the first stage of the reaction, the product is subsequently reacted with the organomercury compound to yield the final product. This second stage of the reaction can employ the same conditions as the first stage. For this reason, there need be no well-defined stopping point between the two reaction stages. Rather it may well be feasible, depending upon the reactants and reaction conditions, to mix all of the starting materials together and complete the reaction with no discernible intermediate stopping point.

Unless otherwise specified, quantities of materials in the following examples are reported in parts by weight.

EXAMPLE 1

A quantity of 5 parts of carbonyl bis(triphenylphosphine) rhodium chloride is dissolved in 800 parts of dry tetrahydrofuran. To the resultant solution 17 parts of a sodium amalgam containing 1% sodium is added after the reaction vessel is purged and charged with carbon monoxide at one atmosphere pressure. The reaction mixture is heated to 60° C. for 10 hours. At the end of that time, the mercury from the amalgam is allowed to settle and the solution is filtered. To the filtrate is added 3 parts of phenylmercury chloride. The mixture is reheated to 60° C. and stirred for one hour. The product, bis(carbonyl)bis(triphenylphosphine)phenylmercury rhodium, is precipitated from solution by cooling to 0° C. and adding 3 liters of methanol. The product in the form of green-yellow crystals is collected by filtration, washed and dried. Yield is 50%. Carbon-hydrogen-phosphorus analyses, both theoretical and experimental, are as follows: calculated, C, 55.00%, H, 3.64, P, 6.45; found, C, 55.26%, H, 3.70, P, 6.62. NMR and IR analyses confirm the structure of the product.

EXAMPLE 2

The procedure of Example 1 is followed exactly except that p-tolylmercury chloride is used instead of the phenylmercury chloride. The final product, a cream-colored crystalline material identified as bis(carbonyl)bis(triphenylphosphine) p-tolylmercury rhodium, was subjected to carbon-hydrogen-phosphorus analysis as well as NMR and IR analyses. Elemental analyses are as follows: calculated, C, 55.44%; H, 3.79, P, 6.36; found, C, 55.24%; H, 3.82, P, 6.14. The NMR and IR analyses confirm the structure of the product.

EXAMPLE 3

The procedure of Example 1 is followed exactly except that 6 parts of carbonyl bis(triphenylphosphine) iridium chloride is used as a starting reactant. The product is a pale yellow crystalline material. NMR and IR analyses indicate that the final product is tris(carbonyl)triphenylphosphine phenylmercury iridium. Elemental analyses are: calculated for the above-named compound, C, 39.25%, H, 2.45, P, 3.80; found, C, 39.87%, H, 2.66, P, 3.80.

EXAMPLE 4

The procedure of Example 3 is followed exactly except that p-tolylmercury chloride is used instead of the phenylmercury chloride. The product is a cream colored crystalline material identified as tris(carbonyl)triphenylphosphine p-tolylmercury iridium. Elemental analyses are: calculated, C, 40.53%, H, 2.65, P, 3.73; found, C, 40.60%, H, 2.73, P, 3.80. NMR and IR analyses confirm the identity and structure of the product.

EXAMPLE 5

The procedure of Example 3 is followed exactly except that benzylmercury chloride is used instead of phenylmercury chloride. The product is a light gray crystalline material identified as tris(carbonyl)triphenylphosphine benzylmercury iridium. Elemental analyses are: calculated, C, 40.53%, H, 2.65, P, 3.73; found, C, 40.35%, H, 2.62, P, 3.86. NMR and IR analyses confirm the identity and structure of the product.

EXAMPLE 6

A quantity of 5.1 parts of carbonyl bis(cyclohexyldiethylarsine) cobalt chloride is dissolved in 800 parts of tetrahydrofuran. To the solution 18 parts of a sodium amalgam containing 1% sodium is added after the reaction vessel is purged and charged with carbon monoxide at 1.5 atmospheres pressure. The reaction mixture is heated to 70° C. for 10 hours. Following that period, the solution is filtered. To the filtrate 3 parts of ethoxymercury chloride is added and the mixture reheated to 50° C. for one hour. The mixture is cooled to 0° C. and precipitated by addition of 3 liters of dioxane. NMR and IR analyses indicate that the precipitated product is tris(carbonyl)cyclohexyldiethylarsine ethoxymercury cobalt.

EXAMPLE 7

A quantity of 6 parts of bis(carbonyl)bis(diphenylstibene) iridium chloride is dissolved in 1000 parts of tetrahydrofuran. To the solution 18 parts of sodium amalgam containing 1% sodium is added after the reaction vessel is purged and charged with carbon monoxide at one atmosphere pressure. The reaction mixture is heated to 60° C. for 10 hours. The solution is filtered at the end of that time and 3 parts of benzylmercury chloride is added. The mixture is maintained at 60° C. for an additional hour, cooled to 0° C. and precipitated by addition of 3 liters of ethanol. NMR and IR analyses indicate that the precipitated product is bis(carbonyl)bis(diphenylstibene) benzylmercury iridium.

EXAMPLE 8

The product of Example 3, tris(carbonyl)triphenylphosphine phenylmercury iridium, is dissolved in tetrahydrofuran to provide a solution containing 1% of the compound. The solution is refluxed with excess iodine to produce bis(carbonyl)triphenylphosphine iridium triiodide. Upon addition of an amount of ethanol equivalent to the tetrahydrofuran, the bis(carbonyl)triphenylphosphine iridium triiodide is precipitated. This compound is an effective catalyst for the carboxylation of olefins as described in U.S. Pat. 3,579,551. This example is provided to illustrate the utility of the compounds of this invention as intermediates used in the preparation of useful compounds.

EXAMPLE 9

A batch reactor is charged with 100 ml. of propionic acid and 0.40 gram of tris(carbonyl)triphenylphosphine phenylmercury iridium prepared as in Example 3. The reactor is pressurized with a 50-50 mixture of carbon monoxide and ethylene to a pressure of 800 p.s.i.g. at a reaction temperature of ~195° C. The reaction is carried out at a constant pressure by feeding the gaseous products as they are used to yield a solution containing 20% propionic anhydride and 80% propionic acid. Selectivity to the formation of acid anhydride is greater than 90%. No substantial amounts of by-products such as other aldehyde, methane, carbon dioxide, or higher boiling carboxylic acids were formed.

This example demonstrates the use of the novel complexes as catalysts for carboxylation of an olefin.

EXAMPLE 10

A batch reactor is charged with 100 ml. of benzene, 20 ml. of hexene-1 and 0.4 gram of bis(carbonyl)bis(triphenylphosphine) phenylmercury rhodium prepared as in Example 1. The reactor is pressured to 800 p.s.i.g. with hydrogen at a reaction temperature of 175° C. The reaction is carried out at constant pressure and results in a solution containing only hexane and benzene.

This example demonstrates the use of the novel complexes as catalysts for hydrogenation of olefins.

EXAMPLE 11

A batch reactor is charged with 100 ml. of benzene, 20 ml. of hexane-1 and 0.4 gram of bis(carbonyl)bis(triphenylphosphine) p-tolylmercury rhodium prepared as in Example 2. The reactor is pressured to 800 p.s.i.g. with a 50-50 mixture of carbon monoxide and hydrogen. The reaction is carried out at 175° C. to produce a mixture of normal and branched $C_7$ aldehydes. This example demonstrates the use of the novel complexes of this invention as catalysts for the carbonylation of olefins.

What is claimed is:

1. An organomercury compound of the formula $$M(CO)_y(ERR^1R^2)_zHgR^3$$

where

M is a Group VIII transition metal which is cobalt, rhodium, or iridium,
E is a Group V-A element having an atomic weight less than 150,
R, $R^1$ and $R^2$ are each hydrogen or monovalent hydrocarbon,
$R^3$ is monovalent hydrocarbon,
y is an integer from 1 to 3, and
z is an integer from 1 to 3.

2. A compound according to claim 1 wherein said transition metal M is rhodium.

3. A compound according to claim 1 wherein said transition metal M is iridium.

4. A compound according to claim 1 wherein the R, $R^1$ and $R^2$ groups are each hydrogen or unsubstituted monovalent hydrocarbon groups attached directly to the element E through a carbon atom.

5. A compound according to claim 1 wherein $R^3$ is unsubstituted monovalent hydrocarbon attached to the mercury through a carbon atom.

6. An organomercury compound of the formula $$M(CO)_y(ERR^1R^2)_zHgR^3$$

where

M is a Group VIII transition metal which is cobalt, rhodium or iridium,
E is a Group V-A element having an atomic weight less than 150,
R, $R^1$, $R^2$ and $R^3$ are each unsubstituted monovalent hydrocarbon attached directly to the element E and to the mercury through a carbon atom,
y is an integer from 1 to 3, and
z is an integer from 1 to 3.

7. A compound according to claim 6 wherein each unsubstituted monovalent hydrocarbon group contains a single aromatic ring.

8. A compound according to claim 6 wherein each of said unsubstituted monovalent hydrocarbon groups is an unsubstituted phenyl group.

9. A compound according to claim 6 wherein M is rhodium or iridium, E is phosphorus or arsenic, R, $R^1$, $R^2$ and $R^3$ are each unsubstituted monovalent hydrocarbon containing a single aromatic ring and attached directly to the E atom and the mercury through a carbon atom, and the integers x and y total 4.

10. Bis(carbonyl)bis(triphenylphosphine) phenylmercury rhodium.

11. Bis(carbonyl)bis(triphenylphosphine p - tolylmercury rhodium.

12. Tris(carbonyl)triphenylphosphinephenylmercury iridium.

13. Tris(carbonyl)triphenylphosphine p - tolylmercury iridium.

14. Tris(carbonyl)triphenylphosphine benzylmercury iridium.

15. A process for preparing an organomercury carbonylated transition metal compound comprising:

(a) reacting a compound of the formula $$(Co)_a-M-(ERR^1R^2)_bX_c$$

wherein

M is a Group VIII transition metal which is cobalt, rhodium or iridium,
E is a Group V element having an atomic weight less than 150,
R, $R^1$ and $R^2$ are each hydrogen or monovalent hydrocarbon,
X is a monovalent anion,
a is an integer from 0 to 4,
b is an integer from 1 to 4 and the sum of $a+b+c$ is 4 to 6 with an alkali metal in the presence of carbon monoxide, and (b) subsequently reacting the product formed with an organomercury group of the formula $$(R^3Hg)+$$

where $R^3$ is a monovalent hydrocarbon attached directly to the mercury atom.

16. A process according to claim 15 wherein the carbon monoxide is present at a pressure of one atmosphere.

17. A process according to claim 15 wherein the alkali metal is added to the compound $$(CO)_a\text{—}M\text{—}(ERR^1R^2)_bX_c$$

in the form of an amalgam.

18. A process according to claim 15 wherein the alkali metal is sodium.

19. A process according to claim 15 wherein the first stage of the reaction is carried out at a temperature from about 20 to about 100° C.

20. A process according to claim 15 wherein the reaction set forth in paragraph (a) of said claim is carried out in the presence of a solvent for the compound $$(CO)_a\text{—}M\text{—}(ERR^1R^2)_bX_c.$$

21. A process according to claim 20 wherein the solvent is a cyclic ether.

22. A process according to claim 20 wherein the solvent is tetrahydrofuran.

23. A process according to claim 15 wherein M is rhodium or iridium.

24. A process according to claim 15 wherein the R, $R^1$, $R^2$ and $R^3$ groups are each unsubstituted monovalent hydrocarbon groups containing a single aromatic ring and attached directly to the E and the mercury atom through a carbon atom.

25. A process for preparing organomercury carbonylated transition metal compounds comprising
    (a) dissolving a compound of the formula $$(CO)_a\text{—}M_1\text{—}(E_1R_1R_1^1R_1^2)_b(X_1)_c$$

where
   $M_1$ is rhodium or iridium,
   $E_1$ is phosphorus or arsenic,
   $R_1$, $R_1^1$, and $R_1^2$ are each unsubstituted monovalent hydrocarbon containing a single aromatic ring and attached directly to the element E through a carbon atom, $X_1$ is a halide ion,
   $a$ is an integer from 0 to 4,
   $b$ is an integer from 1 to 4,
   $c$ is an integer from 1 to 4, and
   the sum of $a+b+c$ is 4 to 6,
   in a cyclic ether solvent,
(b) reacting said compound in said solvent with sodium in the presence of one atmosphere of carbon monoxide, and
(c) subsequently reacting the product formed with an organomercury halide of the formula $$R_1^3HgX_1$$

where
   $R_1^3$ is unsubstituted monovalent hydrocarbon connected directly to the mercury atom through a carbon atom and
   $X_1$ is a halide ion.

References Cited
UNITED STATES PATENTS 3,296,288   11967   Keblys et al. _____ 260—432 X

OTHER REFERENCES

Chemical Abstracts, vol. 66, 121640e (1967).
Chemical Abstracts, vol. 66, 18743s (1967).

HELEN M. S. SNEED, Primary Examiner

U.S. Cl. X.R.

252—431R; 260—429R, 526R, 683.9